(12) United States Patent
Yang

(10) Patent No.: US 9,063,963 B2
(45) Date of Patent: Jun. 23, 2015

(54) METHOD AND SYSTEM FOR MIGRATION OF MANAGED DEVICES

(75) Inventor: Jigang (Eric) Yang, Austin, TX (US)

(73) Assignee: Alcatel Lucent, Boulogne-Billancourt (FR)

(*) Notice: Subject to any disclaimer, the term of this patent is extended or adjusted under 35 U.S.C. 154(b) by 278 days.

(21) Appl. No.: 12/984,047

(22) Filed: Jan. 4, 2011

(65) Prior Publication Data

US 2012/0173689 A1 Jul. 5, 2012

(51) Int. Cl.
*G06F 15/173* (2006.01)
*G06F 17/30* (2006.01)
*H04L 12/24* (2006.01)
*H04L 29/12* (2006.01)
*H04L 29/06* (2006.01)

(52) U.S. Cl.
CPC ............ *G06F 17/303* (2013.01); *H04L 41/042* (2013.01); *H04L 61/1511* (2013.01); *H04L 63/0823* (2013.01)

(58) Field of Classification Search
USPC .................. 709/223, 221; 380/255, 264, 276; 713/150, 163, 181; 726/2, 21, 36
See application file for complete search history.

(56) References Cited

U.S. PATENT DOCUMENTS

| | | | |
|---|---|---|---|
| 6,012,090 A * | 1/2000 | Chung et al. ................... | 709/219 |
| 2001/0039550 A1* | 11/2001 | Putzolu ......................... | 707/205 |
| 2009/0296567 A1* | 12/2009 | Yasrebi et al. ................. | 370/221 |
| 2010/0077438 A1* | 3/2010 | Ansari ............................ | 725/91 |
| 2010/0128639 A1* | 5/2010 | Dehaan et al. ................. | 370/255 |
| 2011/0022689 A1* | 1/2011 | Piepenbrink et al. .......... | 709/221 |

* cited by examiner

*Primary Examiner* — Jason K. Gee
*Assistant Examiner* — Sharif E Ullah
(74) *Attorney, Agent, or Firm* — Hitt Gaines, PC

(57) ABSTRACT

A system and method for migrating a managed subscriber device from an incumbent managing server to a new managing server. Registration data for the subscriber device and authentication certificates are transferred to the new managing server or an associated memory device, and a DNS name and IP address mapping request is transmitted to a DNS server. When the name change is implemented, a DNS lookup for the managing server performed by the subscriber device returns an IP address associated with the new managing server. The new managing server may then assume the management functions with respect to the subscriber device. The migration may be performed for a number of subscriber devices simultaneously.

15 Claims, 3 Drawing Sheets

METHOD AND SYSTEM FOR MIGRATION OF MANAGED DEVICES

TECHNICAL FIELD

The present invention relates generally to the field of managing subscriber devices, and, more particularly, to a method and system for migrating the management of subscriber device or devices from one management server to another.

BACKGROUND

The following abbreviations are herewith defined, at least some of which are referred to within the following description of the state-of-the-art and the present invention.
ASIC Application Specific Integrated Circuit
CPE Customer Premises Equipment
DNS Domain Name Server
IP Internet Protocol Consumer electronics have progressed a great deal in the recent past. Not only are they more capable than they were a short time ago, they are also far more prevalent. Many homes, for example, have more than one personal computer and video storage device, along with many similar devices. These devices are often connected together to form a network, and through the network are capable of communicating with other devices outside of the home. The use of email and telephone services that are available through such networks is very common, and the downloading of, for example, software applications and multimedia transmissions is becoming more frequent.

Connections outside of the home are often facilitated by some type of device that serves as an interface to whatever network service is providing access. Such a device may take the form, for example, of a wireless router connecting multiple computers to the Internet, or a set-top box that receives video and television programming for display on a television or other video display device. Such devices are sometimes referred to as CPE, or customer premises equipment. Such devices are not necessarily autonomous, but are frequently managed in whole or in part by a network component that is located outside of the home. This component will herein be referred to as a management server, although management of the CPE may actually be a task shared by a number of servers working together cooperatively. The management server monitors the CPE to make sure it is on-line, available, and operational. Certain functions of the CPE may also be supervised by the management server, which may also upgrade it's functionality from time to time.

While a carrier or network operator may provide an access network connecting the subscriber's residence with other communication networks, CPE management may in some cases be performed by a third-party vendor. Though such an arrangement may be advantageous for the carrier, certain difficulties may arise if the current vendor is to be replaced. The number of subscriber devices that are under management may be very large, and transferring their management to the new service provider may for this reason be cost prohibitive.

Accordingly, there has been and still is a need to address the aforementioned shortcomings and other shortcomings associated with migrating CPEs from one management server to another. These needs and other needs are satisfied by the present invention.

SUMMARY

The present invention is directed to a manner of migrating management of a CPE or other subscriber device from one managing server to another. In one aspect, the present invention is a method for migrating a managed subscriber device to a second server including transferring registration data related to the home device from a first-server database to a database associated with the second server, transferring the security certificates related to the home device from the first server to the second server, and mapping the IP address of the second server to the name associated with the first server in a DNS. The second server receives a communication from the subscriber device, responds, and assumes management of the subscriber device.

In another aspect, the present invention is a method of migrating at least one subscriber device from an incumbent managing server to a new managing server including requesting registration data associated with the at least one subscriber device, receiving registration data associated with the at least one subscriber device, requesting authentication certificates from the incumbent managing server, receiving authentication certificates; and requesting a DNS name and IP address mapping from a DNS server such that a DNS lookup by the subscriber device will return the IP address of the new managing server. The DNS name and IP address mapping may be requested periodically until an acknowledgement has been received. The new managing server may simply await the arrival of a management message from the subscriber device. The DNS name and IP address mapping may be requested by another component in the subscriber device migration system. The request for registration data and the request for certificates may also originate in the new managing server.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

The present invention is directed to a manner of migrating management of a CPE or other subscriber device from one manager to another. The present invention is of particular advantage where the respective managing servers are operated by different commercial entities because it allows the new managing server to assume the management role without the active participation of the incumbent manager, which can be expected to add to the cost of the migration.

The subscribers to a communications service such as homeowners or small businesses often have a subscriber device that acts as an interface to an outside communication network. Examples may include routers, set-top boxes, and femtocells. Note that a larger business may use these devices as well, but typically do not due to the magnitude of their communications needs, which may in many cases dictate a more customized solution.

Figure 1:
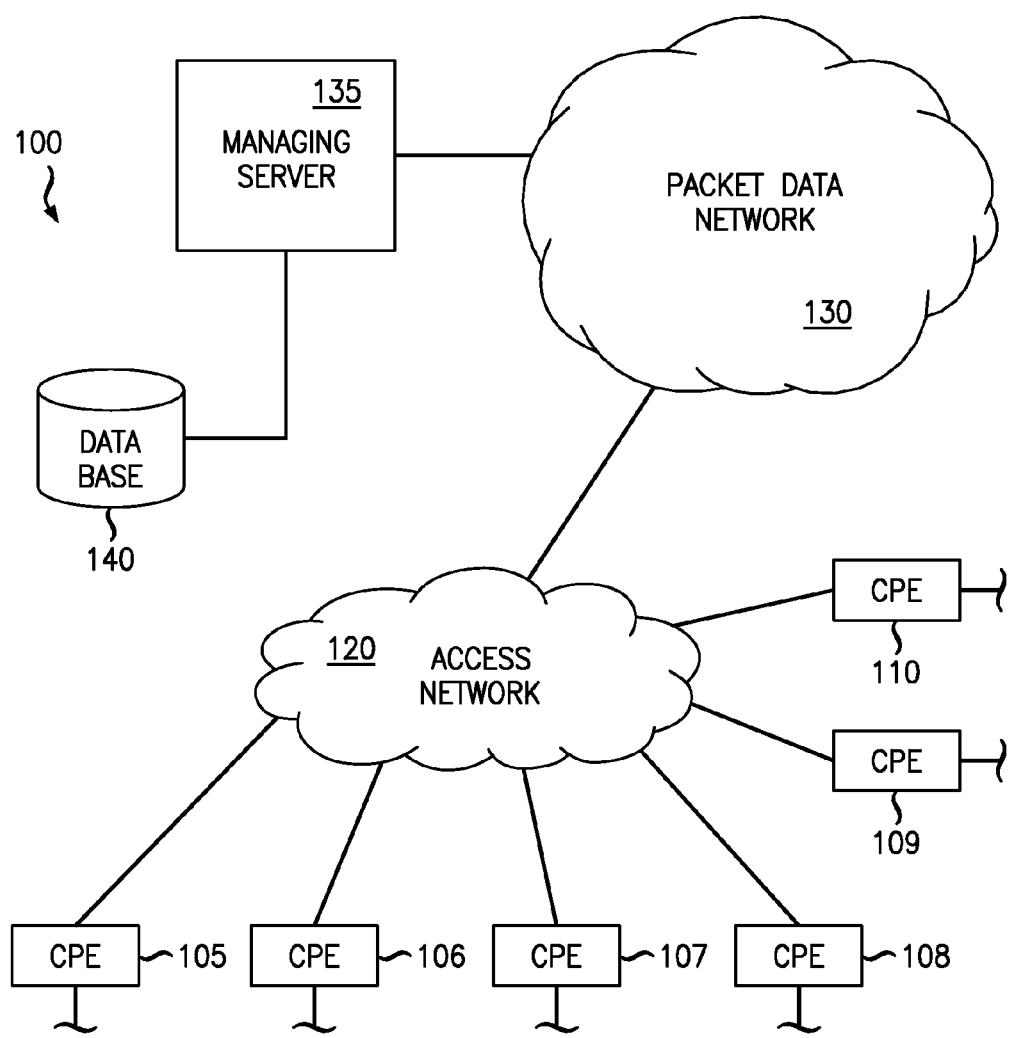
FIG. 1 is a simplified schematic diagram illustrating system for management of subscriber devices.

FIG. 1 is a simplified schematic diagram illustrating system 100 for management of subscriber devices. Shown in FIG. 1 are a number of subscriber devices, numbered CPE (customer premises equipment) 105 through 110. Here it is presumed for convenience presumed that CPEs 105 through 110 are wireless routers for supplying Internet and telephone service to the subscribers with which they are associated. As such they are typically located in different residences. This is only one example, of course, a wide variety of subscriber devices and services are available. In addition, there are usually a far larger number of such devices under management.

Also shown in FIG. 1 is a managing server 135. In implementation, managing server 135 communicates with each of the CPEs 105 though 110 for a number of reasons having to do with the offering of services by a carrier and the details of sending and receiving transmissions. In FIG. 1, each of the CPEs 105 through 110 is connected to an access network 120. Access network may be, for example, a PSTN (public switched telephone network) offering DSL (digital subscriber line) service or a cable service. In any event, the access network 120 includes an individual connection to each residence or small business or other entity by establishing a communication link to the CPE or other subscriber device located there. These links are illustrated in FIG. 1 but not separately referred to.

The access network is connected, in this example, to a PDN (packet data network) 130. A gateway (not shown) may be used to provide the connection between the access network 120 and PDN 130. Through access network 120 and PDN 130, each of the CPEs may access the World Wide Web and a great many services and applications. In this case they may also communicate with management server 135. Management server 135 is typically implemented as a physical processor executing instructions stored as software in a non-transitory medium. In other embodiments, the management server may be implemented as a combination of executable software and hardware such as an ASIC. The management server may be a standalone device or incorporated in a multifunction apparatus that performs other duties as well.

Unlike many of the other applications accessed by the subscriber, many if not all of the communications that take place between a given CPE (or other subscriber device) and management server 135 are transparent to the subscriber. In most cases, the subscriber or user would not wish to be aware of the management communications being exchanges and may have little understanding of what is being accomplished.

Database 140 is a physical memory device associated with management server 135 that is used to maintain not only management programs and instructions for execution by server 135, but also registration data and other information related to each of the subscriber devices under management.

This transparency is desirable, but poses a disadvantage when change in management server is taking place. When, for example, CPE 105 has a need to send a management message to management server 135, a DNS query for the management server returns the IP address of management server 135 as a response. If a new management server is to be used instead of incumbent server 135, a name change could be accomplished at the location of CPE 105 thorough firmware update or other reconfiguration. Given location of the CPE 105 in the home of a subscriber, however, this would mean either arranging for a technician to work on the device or instructing the subscriber on the procedure to be used. Neither of these solutions is generally considered desirable.

While the relevant updates may in some cases be done from the management server 135, this is often less than desirable as well. Management of the CPEs may be being transferred to the servers of another provider, and the incumbent manager may want to be compensated for the service. Although the cost for migrating one device may be trivial, effecting the transfer of hundreds or even thousands of such devices may be prohibitive. A manner of migrating subscriber devices to avoid this disadvantage will now be described.

Figure 2:
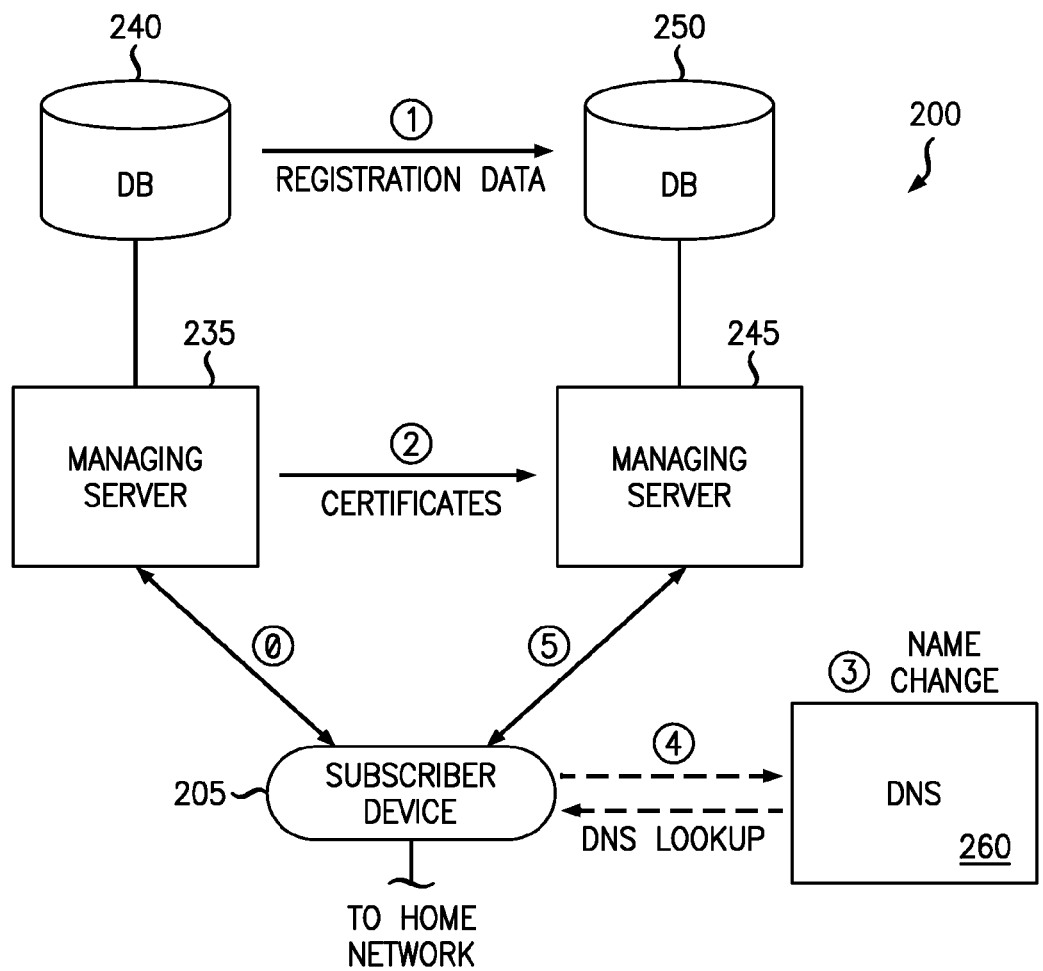
FIG. 2 is a simplified schematic diagram illustrating selected components of a system for managing subscriber devices during the migration process according to an embodiment of the present invention.

FIG. 2 is a simplified schematic diagram illustrating selected components of a system 200 for managing subscriber devices during the migration process according to an embodiment of the present invention. Note that this is an exemplary embodiment and the actual components involved or necessary may vary according to the demands of the implementation. In the system 200 of FIG. 2, managing server 235 and database 240 are analogous to server 135 and database 140 shown in FIG. 1. Managing server 235 may be referred to as the incumbent server as it is currently managing subscriber device 205. This relationship is represented by the line 0, which signifies the management communication but not necessarily, as is apparent from FIG. 1, a direct connection.

In the embodiment of FIG. 2, managing server 245 is a new management server to which management functions are to be migrated. It is associated with database 250. To effect the migration, registration data relating to subscriber device 205 is transferred from database 240 to database 250 (represented by line 1). The registration data may include subscriber profile information and current settings or capabilities of the subscriber device 205. It may also include passwords and other information necessary to the management functions.

In this embodiment certificates used for security and authentication are transferred from managing server 235 to managing server 245 (line 2). Managing server 245 now has the information necessary to assume the management of subscriber device 205. At this point a DNS name change (labeled 3 in FIG. 2) at DNS (domain name server) 260. That is, the DNS server is altered to return the IP address of managing server 245 whenever subscriber device 205 transmits the name it associates with managing server 235. Whenever subscriber device 205 sends a management-related message, it performs a DNS lookup (line 4), it transmits the name of the managing server and, the name change having been performed, receives the IP address of the new managing server 245. The management message is transmitted to the managing server 245, which then assumes responsibility for managing subscriber device 205 (line 5).

Figure 3:
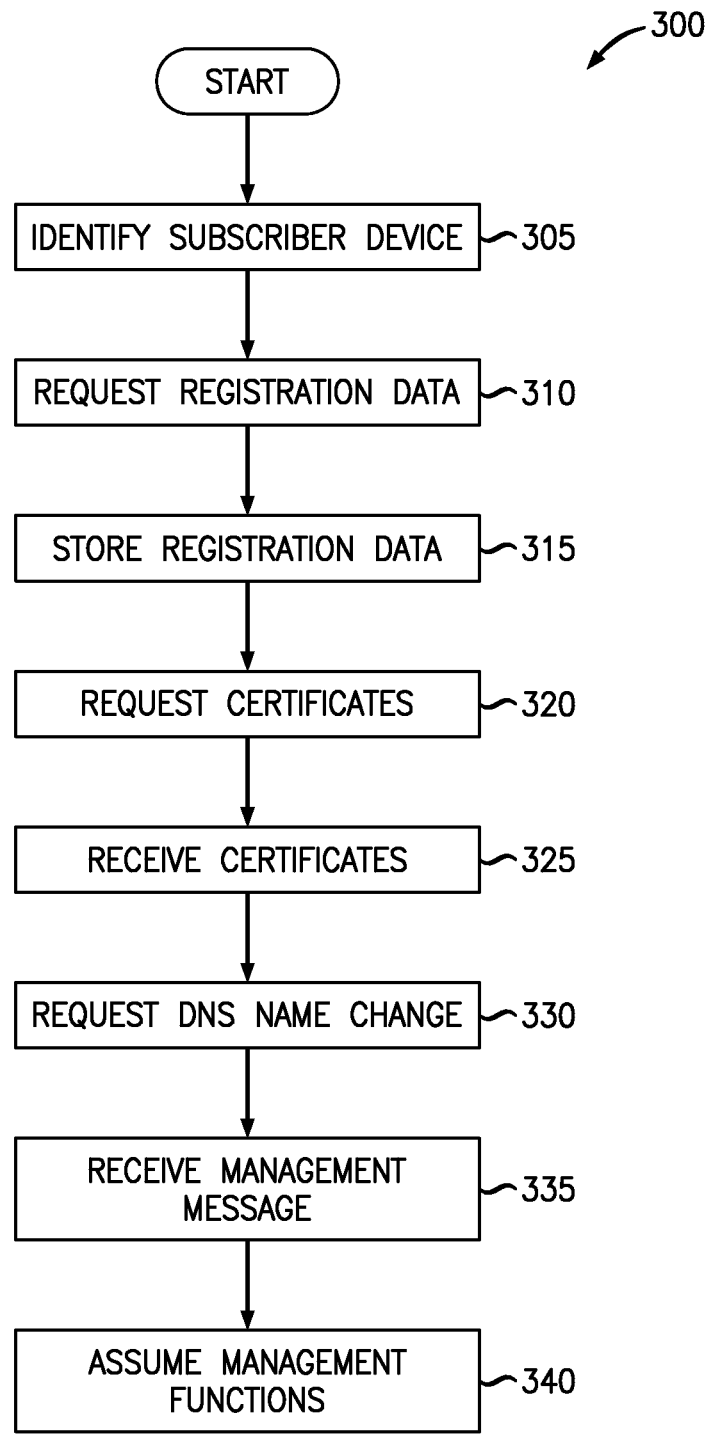
FIG. 3 is a flow diagram illustrating a method of migrating management of a subscriber device according to an embodiment of the present invention.

FIG. 3 is a flow diagram illustrating a method 300 of migrating management of a subscriber device according to an embodiment of the present invention. In this embodiment it is presumed that the components for performing the invention are in place and operational. The process then begins with the identification of at least one subscriber device for migration (step 305). In most cases, of course, a large number of subscriber devices will be migrated in a single operation, but for convenience the method of this embodiment will be described in terms of a single device.

In this embodiment, once a subscriber device has been identified, a request is sent (step 310) for registration data associated with the subscriber device. This request may be made, for example, by the server selected to assume management of the subscriber device, for example managing server 245 shown in FIG. 2, although in other embodiments the request may be initiated from another component as well. As mentioned above, the registration data may be stored in a database associated with the incumbent managing server. When a response is received, the registration data is stored (step 315) in the database associated with the new management server. In an alternate embodiment (not shown), the registration data is stored in a database accessible to both the incumbent server and the new management server, and the latter is simply provided with a way to access the data when needed.

In the embodiment of FIG. 3, security and authentication certificates are then requested by the new management server (step 320). Again, in other embodiments this request may be generated by another component. In any case, when a response to the request is received, the certificates are stored in the new management server (step 325) or in an associated memory device.

In this embodiment, a request is then sent to the DNS (domain name server) (step 330) to request a name change. This name change affects the name sent to the DNS by the subscriber device for requesting the IP address of the management server. Note that in some embodiments (not shown), the name change request of step 330 will be repeated until a confirmation is received. Otherwise, the new management server simply waits for the arrival of a management message from the subscriber device. When the name change is effected, the DNS will return the address of the new management server instead of the incumbent management server when an IP address is requested by the subscriber device. This means that the next communication to the management server from the subscriber device will be sent to the new management server.

In the embodiment of FIG. 3, the new management server eventually receives a management message from the subscriber device (step 335). When this occurs, the migration of to the new management server is confirmed, and the new management servers assume management responsibilities (step 340) for the subscriber device. In an alternate embodiment, the incumbent management server may retain some management functions, either indefinitely or for a designated transition period, although in most implementations this transition period will be very short, if it exists at all.

Note that the sequence of operation illustrated in FIG. 3 represents an exemplary embodiment; some variation is possible within the spirit of the invention. For example, additional operations may be added to those shown in FIG. 3, and in some implementations one or more of the illustrated operations may be omitted. In addition, the operations of the method may be performed in any logically-consistent order unless a definite sequence is recited in a particular embodiment.

Although multiple embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims.

The invention claimed is:

1. A method for migrating a managed subscriber device from an incumbent managing server to a new managing server, comprising:
   transferring registration data related to the subscriber device from a database associated with the incumbent managing server to a database associated with the new managing server, wherein:
   the incumbent and new managing servers monitor the subscriber device to ensure the subscriber device is on-line, available, and operational; and
   the registration data includes profile information of a subscriber using the subscriber device and current settings or capabilities of the subscriber device;
   transferring the security certificates related to the subscriber device from the incumbent managing server to the new managing server; and
   requesting that a DNS server affect a name change such that a subsequent DNS lookup by the subscriber device to determine an address of a managing server will return an address of the new managing server instead of an address of the incumbent managing server, wherein the requesting is not performed by the subscriber device.

2. The method of claim 1, further comprising receiving in the new managing server a communication from the subscriber device.

3. The method of claim 2, further comprising responding to the communication from the subscriber device to the new managing server.

4. The method of claim 3, further comprising management of the subscriber device by the new managing server.

5. A method of migrating at least one subscriber device from an incumbent managing server to a new managing server, comprising:
   requesting, by the new managing server, registration data associated with the at least one subscriber device from a database associated with the incumbent managing server;
   receiving, at the new managing server, registration data associated with the at least one subscriber device from the database associated with the incumbent managing server;
   requesting, by the new managing server, authentication certificates from the incumbent managing server;
   receiving, at the new managing server, authentication certificates from the incumbent managing server; and
   requesting that a DNS server affect a name change such that a subsequent DNS lookup by the subscriber device to determine an address of a managing server will return an address of the new managing server instead of an address of the incumbent managing server, wherein the requesting is not performed by the subscriber device; and wherein:
   the incumbent and new managing servers monitor the subscriber device to ensure the managed subscriber device is on-line, available, and operational; and
   the registration data includes profile information of a subscriber using the subscriber device and current settings or capabilities of the subscriber device.

6. The method of claim 5, further comprising assuming management of the at least one subscriber device by the new managing server.

7. The method of claim 6, wherein the assumption of the at least one subscriber device management does not occur until a management message is received in the new managing server from the subscriber device.

8. The method of claim 6, further comprising sending a management message to the at least one subscriber device from the new managing server prior to receiving a communication from the subscriber device.

9. The method of claim 8, wherein requesting a DNS name change request requesting a DNS name and IP address mapping periodically until an acknowledgement has been received indicated that the name change has been effected.

10. The method of claim 5, wherein the new managing server is associated with a different database than the incumbent managing server and further comprising storing the registration data in a database associated with the new managing server.

11. The method of claim 5, wherein the DNS name change request is sent by the new managing server.

12. The method of claim 5, wherein the at least one subscriber device is a plurality of subscriber devices.

13. The method of claim 12, wherein the request for registration data comprises a request for registration data associated with each of the plurality of devices.

14. A system for migrating management of at least one subscriber device, comprising,
 a new managing server for assuming management of the at least one subscriber device from an incumbent managing server wherein the assumption of management includes at least receiving registration data associated with the at least one subscriber device from a database associated with the incumbent managing server,
 a memory device accessible by the new managing server, and
 a DNS name and IP address mapping requester comprising software instructions executable on a processor requesting that a DNS server affect a name change such that a subsequent DNS lookup by the at least one subscriber device to determine an address of a managing server will return an address of the new managing server instead of an address of the incumbent managing server wherein the requesting does not involve the subscriber device; and wherein:
  the incumbent and new managing servers monitor the subscriber device to ensure the subscriber device is on-line, available, and operational; and
  the registration data includes profile information of a subscriber using the subscriber device and current settings or capabilities of the subscriber device.

15. The system of claim 14, wherein the processor is resident in the managing server.

* * * * *